United States Patent [19]

Yamaguchi

[11] Patent Number: 5,503,344
[45] Date of Patent: Apr. 2, 1996

[54] DOUBLE BEARING TYPE REEL

[75] Inventor: Nobuyuki Yamaguchi, Tokyo, Japan

[73] Assignee: Daiwa Seiko, Inc., Tokyo, Japan

[21] Appl. No.: 223,179

[22] Filed: Apr. 5, 1994

[30] Foreign Application Priority Data

Apr. 5, 1993 [JP] Japan .................. 5-101969

[51] Int. Cl.⁶ .............................................. A01K 89/033
[52] U.S. Cl. .................. 242/260; 242/271; 242/303; 242/319
[58] Field of Search .................... 242/260, 261, 242/264, 267, 268, 270, 271, 319, 303

[56] References Cited

U.S. PATENT DOCUMENTS

| | | | |
|---|---|---|---|
| 1,941,739 | 1/1934 | Crawford | 242/271 |
| 1,980,345 | 11/1934 | Long et al. | 242/270 |
| 2,389,515 | 11/1945 | King | 242/264 |
| 2,462,365 | 2/1949 | Crawford | 242/271 |
| 3,017,135 | 1/1962 | Wood | 242/271 |
| 3,478,979 | 11/1969 | Henze | 242/270 |
| 4,546,937 | 10/1985 | Hideo | 242/271 |
| 4,638,958 | 1/1987 | Furomoto | 242/319 X |
| 4,651,949 | 3/1987 | Sato | 242/319 X |
| 4,813,629 | 3/1989 | Hashimoto et al. | 242/271 |

FOREIGN PATENT DOCUMENTS

| | | | |
|---|---|---|---|
| 2278258 | 2/1976 | France | 242/270 |
| 63-75174 | 5/1988 | Japan . | |

*Primary Examiner*—Joseph J. Hail, III
*Attorney, Agent, or Firm*—Longacre & White

[57] ABSTRACT

In a double bearing type fishing reel requiring a large braking force between a spool and a central shaft, a brake device having a large braking surface is stored in the water-tight side chamber. The water-tight side chamber is disposed opposite from another chamber storing the drive device for inputting handle rotation. Since the drive device and brake device are disposed separately from each other on either side of the spool, the weight of the reel is well balanced.

14 Claims, 2 Drawing Sheets

3,503,344

1

DOUBLE BEARING TYPE REEL

BACKGROUND OF THE INVENTION

The present invention relates to a double bearing type reel and, in particular, to a double bearing type reel of a generally large size including a brake device which is disposed on the rotary central shaft of a spool.

In general, in a double bearing type reel of a large size for use in trolling and the like, there is known to incorporate a brake device which is capable of applying a brake force to the rotational movement of a spool in a fishing line playing-out direction and which is disposed on the side surface of a spool with a brake force adjusting member disposed outside of a reel main body. However, this type of reel does not give much consideration to a fishing operation which is executed under severe environmental conditions. Therefore, seawater is likely to enter and attach itself to a brake plate employed in the brake device during use to thereby lower the braking performance thereof.

In order to solve the above-mentioned problem, the Japanese Utility Model Kokai Publication No. Sho. 63-75174 discloses a double bearing type reel wherein a drag disk and brake disk forming a brake device is separated from other components to provide a watertight construction for the brake device.

However, in the double bearing type reel disclosed in the above-mentioned Japanese Utility Model Publication, since the brake device and a handle drive device are disposed on the same side of a reel main body, the weight of the reel is biased on the side to deteriorate stability of the reel and the reel main body is hard to be grasped and held by hand during the reel operation to deteriorate the operationability of the reel.

Further, the state change of the reel, that is, change from a given brake force applying state to a spool free state is executed by an adjusting operation to reduce the brake force, and similarly change from the spool free state to the given brake force applying state requires an adjusting operation to increase the brake force, which makes it difficult to change the state of the reel rapidly. That is, a series of these operations cannot be executed smoothly, which results in a poor operationability.

SUMMARY OF THE INVENTION

In view of the above-mentioned conventional circumstances, it is an object of the invention to provide a double bearing type reel which can hold a brake device watertight, is improved in balance in grasping and holding a reel main body in operation, and is thus improved in operationability.

Further, it is another object of the invention to provide a double bearing type reel which allows quick change of state between a spool free state and a given brake force re-setting state and is improved in operationability.

In order to attain the above-noted and other objects, the present invention provides a fishing reel including: a reel main body rotatably supporting a spool, and defining first and second side chambers located opposite from each other with respect to the spool; a central shaft passing through a substantially central portion of the spool and extending into both the first and second side chambers, the central shaft being rotatably arranged with respect to the reel main body; a drive device located within the first chamber for transmitting rotation from a handle to the central shaft; and a brake device located within the second chamber for coupling the central shaft to the spool through a frictional force. The fishing reel preferably further includes: a braking force adjusting device for adjusting the frictional force produced by the braking device, a clutch device interposed between the braking device and one of the spool and central shaft for operatively disengaging the one of the spool and central shaft from the braking device to permit the spool to freely rotate with respect to the central shaft. The second chamber is formed as a water-tight chamber.

The present invention further provides a fishing reel including: a reel main body rotatably supporting a spool; a central shaft passing through a substantially central portion of the spool and rotatably arranged with respect to the reel main body; a drive device for transmitting rotation from a handle to the central shaft; a brake device located within a water-tight chamber for coupling the central shaft to the spool through a frictional braking force, the water-tight chamber being defined by the reel main body and located adjacent the spool in an axial direction of the central shaft; and a clutch device for selectively cutting off a transmission path of the frictional braking force between the central shaft and the spool. The fishing reel preferably further includes: a braking force adjusting device for adjusting the magnitude of the frictional braking force.

According to the present invention, the brake device is stored in a side chamber and can be formed with a greater braking surface to generate a greater brake force between the central shaft and spool. The side chamber storing therein the brake device is a watertight side chamber which is disposed opposite from the drive device. That is, since the drive device and brake device are disposed separately from each other on either side of the spool, the weight of the reel is well balanced so that the reel can be well grasped and held in operation. Also, because the side chamber storing the brake device therein is watertight, the brake device can securely maintain its braking performance at the reversely rotated state of the spool. Due to these characteristics of the invention, the operationability of the present reel is improved to a great extent. Moreover, the force of the brake device which generates the great brake force can be adjusted by a brake force adjust device, whereas with a clutch device it is possible to immediately shift the state of the reel, i.e. from a given brake force applying state to a spool free state, or from the spool free state to a given set value just before the free state.

DETAILED DESCRIPTION OF THE PREFERRED EMBODIMENTS

Now, description will be given below in detail of the invention by way of an embodiment thereof illustrated in the accompanying drawings.

Figure 1:
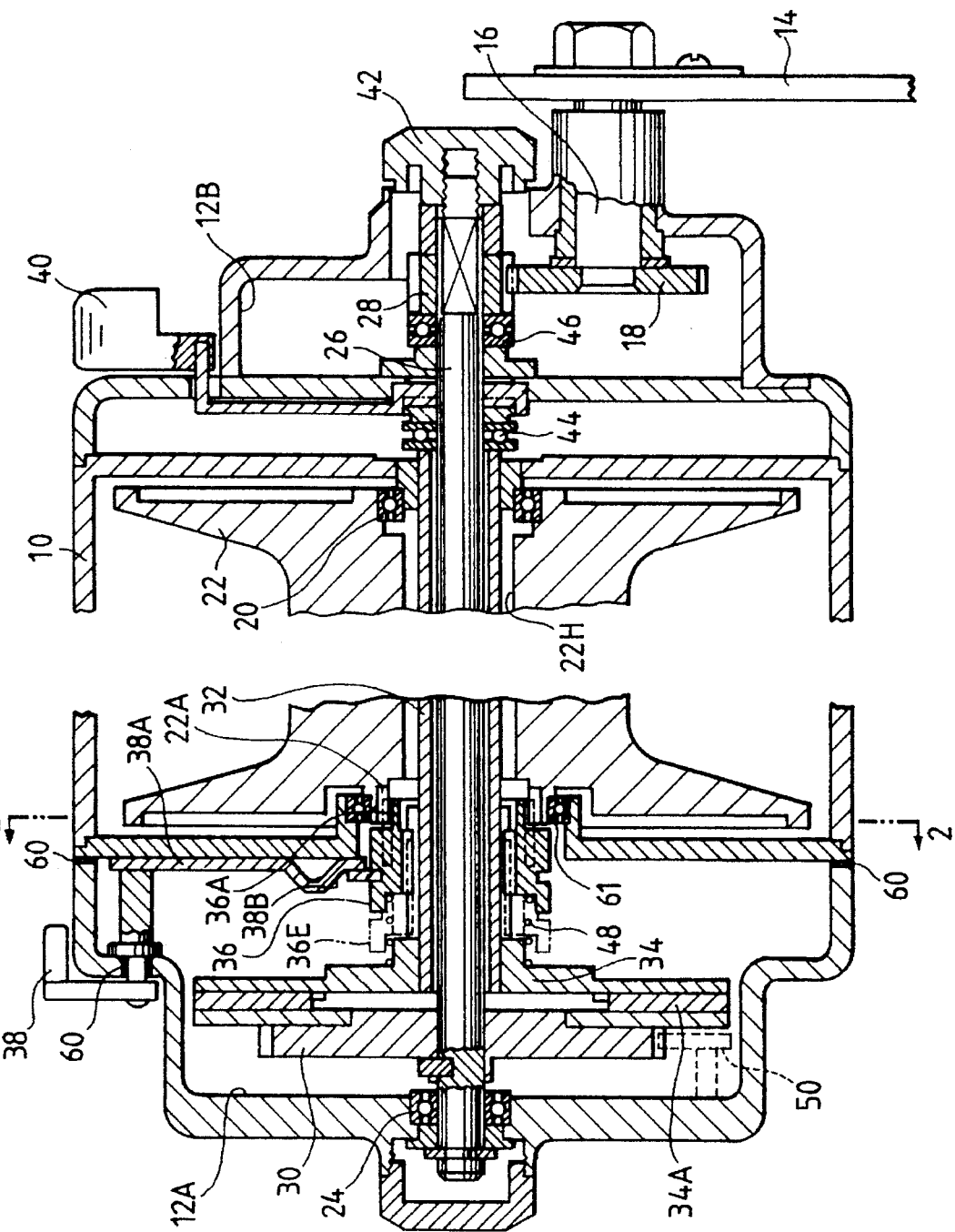
FIG. 1 is a section view of a double bearing type reel according to the invention; and, FIG. 2 is a partially transverse section view of the main portions of the reel taken along the arrow line 2—2 in FIG. 1.
Figure 2:
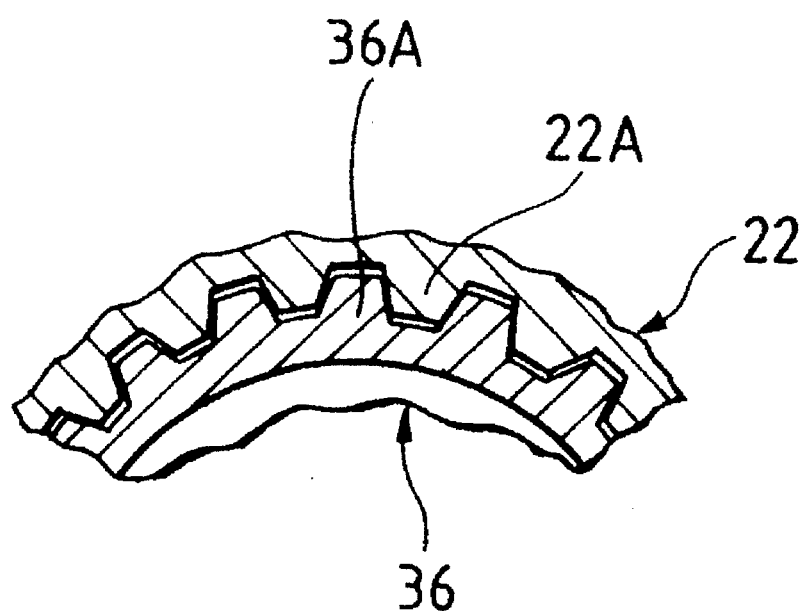

FIG. 1 is a section view of a double bearing type reel according to the invention, and FIG. 2 is a view of the main portions of a section taken along the arrow line 2—2 in FIG. 1. In the left and right sections of a reel main body 10, there are provided a left side chamber 12A and a right side chamber 12B respectively formed by means of a casing, and the left side chamber 12A is arranged watertight in this embodiment. The watertight construction for the left side chamber 12A is accomplished by the provision of sealing members 60 such as O-rings at suitable locations. Further, grease in the bearing 61 prevents water from entering the left side chamber 12A.

In the central portion of the reel between the left and right side chambers 12A and 12B, a spool 22 is rotatably mounted to a reel main body 10 through a bearing 20. A central shaft 26 is inserted through a central hole 22H formed in the spool 22 and is mounted rotatably through a bearing 24 and the like with respect to the body 10, while the two end portions of the central shaft 26 are respectively extended into the left and right side chambers 12A and 12B.

A handle shaft 16 is rotatably mounted in parallel to the central shaft 26 and located at the lower portion of the right side chamber 12B. A handle 14 is provided on the shaft 16 outside the right side chamber 12B so as to rotationally drive the handle shaft 16. On the other hand, a drive gear 18 is fixed to the other side of the handle shaft 16 within the right side chamber 12B.

On a shaft portion of the central shaft 26 within the right side chamber 12B, there is mounted a pinion 28 such that it is in mesh with the drive gear 18 and is rotatable together with the central shaft 26. A thrust bearing 46 contacting the pinion 28 is mounted on the shaft portion of the central shaft 26 so as to permit the central shaft 26 to move in the axial direction thereof relative to the pinion 28 when an adjust knob 42 (which will be described later) is rotatively operated.

On the other hand, between the central hole 22H of the spool 22 and the central shaft 26, there is mounted a cylinder 32 such that it is prevented from contacting the central shaft 26 and spool 22 and is rotatable with respect to the reel main body 10. To the left end portion of the cylinder 32 located within the left side chamber 12A, there is fixed a brake member 34 having a lining member 34A mounted to the left surface of the brake member 34.

To the left portion of the central shaft 26 located within the left side chamber 12A, there is fixed a brake disk 30 in such a manner that it faces the lining member 34A of the brake member 34. The brake disk 30 is normally prevented from rotating reversely by a reversal preventive device 50. As described above, in the double bearing type reel according to the invention, since the brake disk 30 and brake member 34 are respectively formed concentrically with respect to the central shaft 26 extending through the center of the spool 22, they can be arranged to have a diameter nearly equal to that of the spool 22. Therefore, the present double bearing type reel is ideal for a reel which requires a greater brake force when compared with a double bearing type reel including a brake device on the handle shaft 16.

Here, the cylinder 32 can be moved longitudinally through a thrust bearing 44 by rotating a brake member pressure lever 40. This permits the brake member 34 to be pressed against and separated from the brake disk 30. FIG. 1 shows a state in which the lining member 34A of the brake member 34 is pressed against the brake disk 30.

In this case, since the pressures of the two members 30 and 34 generate a friction between the two members 30 and 34, the rotational force of the handle 14 can be transmitted from the brake disk 30 to the brake member 34 and at the same time there is produced a brake force against the spool reverse rotation which is the rotation (a reverse rotation) of the spool 22 in the fishing line playing-out direction. In order to adjust the magnitude of the brake force, the central shaft 26 is moved axially by rotating the adjust knob 42 to thereby adjust a force which presses the brake disk 30 against the brake member 34.

To the cylinder 32, there is mounted a slide member 36 which is slidable axially with respect to the cylinder 32 and can be rotated together with the cylinder 32. The slide member 36 is always energized in the direction (in FIG. 1, in the right direction) of the spool 22 by a coil spring 48. One end 36A of the slide member 36 is engageable with a securing portion 22A formed in the spool 22 in such a manner as shown in FIG. 2, so that the rotations of the cylinder 32 and spool 22 can be transmitted to each other.

On the other hand, a clutch lever 38 is provided at the side of the left side chamber 12A. If the clutch lever 38 is rotated, then an inclined portion 38B of a link 38A secured to the clutch lever 38 moves the slide member 36 leftward against the energization force of the coil spring 48 to thereby remove or release the engagement of the slide member 36 with the securing portion 22A of the spool 22. Owing to this structure, while maintaining a state where the brake disk 30 and brake member 34 are pushing against each other with a given pressure force, the engagement between the slide member 36 and spool 22 can be released to provide a free state by means of one touch operation of the clutch lever 38, or a given brake force can be applied to the spool 22 by returning the clutch lever 38.

In the above-mentioned structure, if the handle 14 is rotated, then the drive gear 18, pinion 28, central shaft 26 and brake disk 30 are rotated. If the brake member pressure lever 40 is set at a given position, as shown in FIG. 1, the brake disk 30 and brake member 34 are then caused to push against each other. Also, if the clutch lever 38 is returned to thereby set up such a state as shown in FIG. 1, then the rotational force of the brake disk 30 can be transmitted to the brake member 34, cylinder 32, slider 36 and spool 22. In this case, if the fishing line (not shown) of the spool 22 is pulled strongly by fish, then a force in the reversal direction will be given to the spool 22. And, such reversal direction force exceeds a force of a magnitude to be determined by a friction between the brake disk 30 and brake member 34, then the spool 22 is caused to rotate reversely. This prevents the fishing line from being cut.

However, a brake force corresponding to the above friction acts on the reversed rotation of the spool 22. Also, to make the spool 22 free immediately from this state, simply the clutch lever 38 is rotated to thereby disengage the slide member 36 from the spool 22. This cuts off the transmission path of the brake force with respect to the spool 22, so that the spool 22 is free from the influences of the brake force and is thus turned into a free state. After then, to return again to the original braking state, the clutch lever 38 may only be returned so that the slide member 36 can be engaged with the spool 22 and thus the original brake force can be given. In this manner, according to the invention, it is possible to perform smoothly an operation to fight against such fish which requires a great brake force.

Also, according to the double bearing type reel of the invention, since the spool 22 to be pulled by a strong force is provided in the center of the reel main body and the drive devices 14, 16, 18, 28 and the brake devices 30, 34, 36 are disposed spaced from each other on either side of the spool 22, the weight of the reel is well balanced and the reel is easy to grasp and hold in operation.

Further, because the brake devices 30, 34, 36 are stored in the chamber 12A which is enclosed by the casing and is highly watertight, there is eliminated the possibility that seawater can enter and attach itself to the brake devices 30, 34 to thereby lower the braking performance thereof while the reel is being used in a severe fishing environment.

As can be clearly understood from the foregoing description, according to one aspect of the invention, since the drive devices and brake devices are disposed spaced apart from each other on either side of a spool and the brake devices are stored in the watertight chamber, the weight of the present reel is well balanced, the grasping and holding property of the reel main body in operation is improved, and there is eliminated the possibility that the braking performance of the reel brake device can be lowered due to attachment of seawater and the like.

Also, according to another aspect of the invention, the existence of the clutch device eliminates the need to change or adjust the brake force adjusted by the brake force adjust device and permits one-touch switching between the spool free state and the original braking state, thereby improving the operationability of the reel greatly. And, since the brake devices are stored in the watertight chamber, there is eliminated the possibility that the braking performance of the brake devices can be lowered due to attachment of seawater and the like.

What is claimed is:

1. A fishing reel comprising:
   a reel main body rotatably supporting a spool, and defining first and second side chambers located opposite from each other with respect to said spool;
   a central shaft passing through a substantially central portion of said spool and extending into both said first and second side chambers, said central shaft being axially movable and rotatably arranged with respect to said reel main body;
   drive means located within said first chamber for transmitting rotation from a handle to said central shaft;
   brake means located within said second chamber for coupling said central shaft to said spool through a frictional force, wherein said frictional force is adjusted by axial movement of said central shaft; and
   a hollow cylinder coaxially and relatively rotatably arranged with respect to said central shaft and extending through an annular space defined between said central shaft and said central portion of said spool, wherein said frictional force is adjusted by an axial movement of said hollow cylinder;

2. The fishing reel according to claim 1, further comprising:
   braking force adjusting means for adjusting said frictional force produced by said braking means.

3. The fishing reel according to claim 1, further comprising:
   clutch means interposed between said braking means and one of said spool and central shaft for operatively disengaging said one of said spool and central shaft from said braking means to permit said spool to freely rotate with respect to said central shaft.

4. The fishing reel according to claim 3, wherein said clutch means is slidingly disposed on said hollow cylinder.

5. The fishing reel according to claim 1, wherein said second chamber is a water-tight chamber.

6. A fishing reel comprising:
   a reel main body rotatably supporting a spool;
   a central shaft passing through a substantially central portion of said spool and rotatably arranged with respect to said reel main body;
   drive means for transmitting rotation from a handle to said central shaft;
   a hollow cylinder coaxially and relatively rotatably arranged with respect to said central shaft and extending through an annular space defined between said central shaft and said central portion of said spool;
   brake means located within a water-tight chamber for coupling said central shaft to said spool through a frictional braking force, said water-tight chamber being defined by said reel main body and located adjacent said spool in an axial direction of said central shaft; and
   clutch means for selectively cutting off a transmission path of said frictional braking force between said central shaft and said spool, a magnitude of said frictional braking force being adjusted by an axial movement of said central shaft, wherein said clutch means is slidingly disposed on said hollow cylinder.

7. The fishing reel according to claim 6, further comprising:
   braking force adjusting means for adjusting the magnitude of said frictional braking force.

8. The fishing reel according to claim 6, wherein said clutch means is located within said water-tight chamber.

9. The fishing reel according to claim 6, wherein said drive means is located with another chamber defined by said reel main body and located opposite from said water-tight chamber with respect to said spool.

10. The fishing reel according to claim 6, wherein said frictional force is adjusted by an axial movement of said hollow cylinder.

11. A fishing reel having a main body defining first and second chambers located opposite from each other with respect to a spool rotatably arranged with respect to said main body, said reel comprising:
    a central shaft passing through a central portion of said spool and rotatably arranged with respect to said main body;
    a hollow cylinder coaxially and relatively rotatably arranged with respect to said central shaft and extending through an annular space defined between said central shaft and said central portion of said spool;
    braking means located within said first chamber and having first and second braking members frictionally engageable with each other, wherein said first and second braking members are non-rotatably fitted onto said central shaft and said hollow cylinder, respectively; and
    shifting means including a slider non-rotatably and translatably fitted onto said hollow cylinder for selectively engaging and disengaging said hollow cylinder with or from said spool.

12. The reel according to claim 11, further comprising:
    drive means located within said second chamber for transmitting rotation from a handle to said central shaft.

13. The reel according to claim 11, further comprising an adjustment means for adjusting an axial position of said hollow shaft, wherein said hollow shaft is translatable relative to said central shaft so as to move said second braking member away from said first braking member.

14. The reel according to claim 11, further comprising an adjustment means for adjusting an axial position of said central shaft, wherein said central shaft is translatable relative to said hollow shaft so as to adjust the degree of the frictional engagement between said first and second braking members.

* * * * *